United States Patent [19]

Teutsch et al.

[11] Patent Number: 5,779,959
[45] Date of Patent: Jul. 14, 1998

[54] PROCESS FOR FORMING PLASTIC ARTICLES

[75] Inventors: Erich O. Teutsch, Pittsfield, Mass.; Dennis J. Coyle, Clifton Park, N.Y.

[73] Assignee: General Electric Company, Pittsfield, Mass.

[21] Appl. No.: 676,997

[22] Filed: Jul. 8, 1996

Related U.S. Application Data

[63] Continuation of Ser. No. 368,672, Jan. 4, 1995, abandoned, which is a continuation of Ser. No. 797,021, Nov. 25, 1991, Pat. No. 5,393,216, which is a continuation-in-part of Ser. No. 585,452, Sep. 20, 1990, Pat. No. 5,069,612.

[51] Int. Cl.$^6$ .................... B29C 47/06; B29C 49/22
[52] U.S. Cl. .................. 264/171.26; 264/171.27; 264/209.8; 264/515; 425/133.1; 425/523
[58] Field of Search ................ 264/515, 540, 264/173, 209.8, 171.26, 171.27, 171.28; 425/133.1, 532, 461, 462, 523

[56] References Cited

U.S. PATENT DOCUMENTS

| | | |
|---|---|---|
| 3,321,803 | 5/1967 | Corbett . |
| 3,345,690 | 10/1967 | Hagen ........................... 264/209.8 |
| 3,497,582 | 2/1970 | Pettersson ...................... 264/540 |
| 3,649,143 | 3/1972 | Papesh et al. . |
| 4,102,603 | 7/1978 | Smith et al. . |
| 4,111,630 | 9/1978 | Shiomi et al. . |
| 4,120,633 | 10/1978 | Feuerherm . |
| 4,167,383 | 9/1979 | Murakami et al. . |
| 4,182,603 | 1/1980 | Knittel . |
| 4,185,954 | 1/1980 | Murakami et al. . |
| 4,305,902 | 12/1981 | Uhlig ............................. 264/540 |
| 4,522,775 | 6/1985 | Briggs et al. . |
| 4,563,147 | 1/1986 | Langecker .................... 264/209.8 |
| 4,578,025 | 3/1986 | Ando et al. . |
| 4,649,004 | 3/1987 | Nohara et al. . |
| 4,657,497 | 4/1987 | Dehennau et al. . |
| 4,798,526 | 1/1989 | Briggs et al. ..................... 264/515 |
| 4,832,589 | 5/1989 | Gini et al. . |
| 4,867,664 | 9/1989 | Fukuhara . |
| 4,889,477 | 12/1989 | Wortberg et al. . |
| 5,069,612 | 12/1991 | Teutsch et al. . |
| 5,076,776 | 12/1991 | Yamada et al. . |

FOREIGN PATENT DOCUMENTS

| | | |
|---|---|---|
| 0-215-337 | 8/1986 | European Pat. Off. . |
| 0-274-095 | 12/1987 | European Pat. Off. . |
| 3-623-308 | 1/1988 | Germany . |
| 54-15891 | 6/1979 | Japan . |
| 59-29141 | 2/1984 | Japan . |
| 88/00125 | 1/1988 | WIPO . |

Primary Examiner—Catherine Timm

[57] ABSTRACT

A polymer resin extrusion head includes one or more annular extrusion modules in which a spiral channel means having one or more convolutions extends from a resin inlet on the periphery of the module to an annular extrusion outlet. Preferably, the channel means gradually opens into an annular frustoconical space leading to the extreusion outlet at the inner edge of the module. The spiral channel extends symmetrically around the extrusion module or modules in a manner so as to subject all of the extruded polymer flowing from the inlet to the extrusion outlet to substantially the same process conditions along the flow path. As a result, the polymer is distributed at the outlet with properties which are substantially symmetrical around the axis of the extrusion module or modules for all resin distributed to the outlet. It is preferable that the extrusion module or modules comprise a pair of mating annular members with central frustoconical portions having apexes with an axial dimension greater than the axial dimension of the outer portions of the modules so as to form air spaces around each module including frustoconical air space portions to avoid direct heat transfer between adjacent modules.

14 Claims, 7 Drawing Sheets

PROCESS FOR FORMING PLASTIC ARTICLES

RELATED APPLICATION

This is a continuation of Ser. No. 08/368,672 filed on Jan. 4, 1995, now abandoned which is a continuation of Ser. No. 07/797,021 filed on Nov. 25, 1991, now issued as U.S. Pat. No. 5,393,216 which is a continuation-in-part of Ser. No. 07/585,452 filed on Sep. 20, 1990, also now issued as U.S. Pat. No. 5,069,612.

BACKGROUND OF THE INVENTION

1. Field of the Invention

The invention relates to resin extrusion apparatus and particularly to extrusion heads for producing articles with one or more tubular layers such as parisons, wire coatings, blown films, pipes, pultruded rods, profiles, reinforced sheets, etc.

2. Description of Prior Art

Parisons, tubular extrusions of plastic resin which are subsequently blow molded to form bottles or other containers, are formed in the prior art by various apparatus some including extrusion heads which extrude successive layers of plastic resin onto a mandrel. A typical multilayer parison extrusion head has separate inlets for receiving heated and plasticized resin from individual screw extruders and has separate channels for distributing and expressing the respective plastic resins in successive layers on the mandrel. Each channel includes an annular equalization and distribution chamber surrounding and spaced from the mandrel for receiving the plastic resin from the corresponding inlet. From the equalization chamber the plastic resin is fed though a frustoconical transfer passage downward and inward to a tubular extrusion channel formed around the mandrel. This annular extrusion channel exits through an inwardly or outwardly flaring annular die which includes a conical core member which may be moved longitudinally relative to the outer member of the die to vary the thickness of the wall of the extruded tubular article.

One particularly useful and successful extrusion head for forming tubular articles such as parisons is disclosed in U.S. Pat. No. 4,798,526. This head includes one or more individual annular extrusion modules surrounding respective successive portions of a stepped or tapered mandrel to form the annular extrusion channel which receives one or more successively extruded plastic resin layers from the modules. Each module has a pair of members with mating surfaces wherein the equalization and distribution chamber and the frustoconical transfer passage are formed. Having the head formed from individual coaxially spaced extrusion modules enables the head to be readily assembled and disassembled as well as enabling the assembly of an extrusion head with varying numbers of modules so that a module can be used in one assembled head to extrude a single layer tubular article or can be used in a differently assembled head to extrude any layer of a multilayer article. The modules forming an extrusion head can be positioned in any desired order. Furthermore, the die modules are separated from each other by annular air spaces. Concentric tubular necks or collars extend from each module into engagement with an adjacent module to define the separation distance or the width of the air spaces between modules. These air spaces prevent heat transfer from a high temperature module to an adjacent low temperature module. Low temperature resins can be degraded if heated to the higher temperature. This patent further discloses polymer inlet pressures at the extrusion head of 4,000 to 6,000 psi (27,000 to 41,000 KPa) for polycarbonate, 2,500 to 4,000 psi (17,000 to 28,000 KPa) for polypropylene, and 2,000 to 3,000 psi (13,000 to 21,000 KPa) for tie resins and barrier resins.

U.S. Pat. Nos. 3,649,143, No. 4,111,630 and No. 4,182,603 disclose tubular extrusion dies for blow molding of multi-ply films and having nested frustoconical, hemispherical, and cylindrical die members forming polymer distribution chambers wherein spiral and helical grooves are formed on the outer surfaces of inner members. These, grooves progress from points near or at the inlets toward the outlets with decreasing depth so that the polymer flow is gradually forced out of the grooves and into the frustoconical, hemispherical or tubular space between die members to evenly distribute the polymer around the chamber. These nested arrangements have several deficiencies such as limiting any temperature differential between the different layers being extruded, requiring larger heads for extruding greater numbers of layers, and having long conical passages from the end of the groove or grooves to the annular outlet.

Generally the prior art tubular extrusion apparatus requires a restrictive frustoconical transfer passage from the distribution chamber to the annular outlet from which the tubular article is extruded. This restrictive passage provides a relatively large pressure drop, i.e., greater than 50% of the total pressure drop from the extrusion head inlet-through the distribution region or chamber and the restrictive -passage to the outlet, in order to assist in even distribution of the polymer in the distribution chamber. In the absence of the restrictive outlet passage with the relatively large pressure drop, the polymer tends to flow at a greater rate along the shortest path between the inlet to the distribution chamber and the closest region of the annular outlet producing unevenness in the thickness of the tubular article about its circumference.

While the prior art apparatus is generally efficient and successful in the extrusion of tubular articles such as multilayer parisons, blown films, wire coatings, etc., there is room for improvement. In addition to the pressure differential problems discussed above, the stresses caused by temperature differentials need to be reduced. For instance, polymer melt in prior art extrusion heads flow from the inlet side of an equalization and distribution chamber to the opposite side. As a result, resins processed in prior art extrusion heads are subjected to temperature differentials, as well as subjected to the above-described pressure differentials, as the resin is processed through the inlet, the distribution means, and outlet extras result of these processing differentials the resin extrudate will deposit in a non-homogeneous distribution, thereby creating actual and latent internal stresses in the extruded parison. Then when the parison is formed into a final shape of a bottle or similar container, such internal stresses will be carried forward, and perhaps in some instances even exacerbated, in the final product. For instance, if the bottle or like article is to be reused and subjected to high temperature cleaning or the like and filled under pressure, e.g., with carbonated beverage, the article may explode as a result of such internal stresses. Given that prior extrusion apparatus are likely unable to alleviate these stresses there is a need to further improve extrusion heads. This is especially so in light of environmental demands which require reuse of containers rather than their disposal in landfills or the like.

Accordingly an object of the present invention is to construct a new and improved polymer extrusion head and process for tubular extrusions which minimize processing differentials that occur in prior art extrusion heads and processes and thereby resulting in a more homogenous distribution of polymer as it is extruded.

It is also an object of the invention to provide a container having superior properties as a result of the improved polymer distribution described above, and to thereby provide a container having sufficient properties to be effectively and safely reused or reclaimed.

SUMMARY OF THE INVENTION

The present invention provides a process for extruding containers which achieves the above described object, the process comprising disposing and securing an extrusion module or modules along a longitudinal axis;

said extrusion module or modules each having a resin inlet, a bore having an inner cylindrical surface, and an annular extrusion outlet opening into said inner cylindrical surface;

each of said module or modules having channel means for receiving and distributing resin extending from the inlet to the outlet and defining a flow path for the polymer to flow from the inlet to the annular extrusion outlet through which the polymer is extruded in annular form, said channel means extending symmetrically around the longitudinal axis of said extrusion module or modules in a manner so as to subject all of the polymer flowing from said inlet to said outlet to substantially the same process conditions along said flow path whereby the polymer is distributed at the annular outlet with properties which are substantially symmetrical around the axis for all resin distributed through the outlet;

introducing a polymer material into said inlet and flowing said polymer through the module or modules from the inlet and through said flow path to said extrusion outlet so that the flowing polymer material substantially circumscribes the axis and arrives at the extrusion outlet with properties which are substantially symmetrical around the axis for all polymer flowing through the module or modules;

extruding the polymer material through said extrusion channel;

forming a parison from the polymer material as it exits the extrusion channel, and molding a container from the parison so formed, whereby said container is formed substantially free of internal stresses which otherwise result from peripheral variations in the properties of the extruded polymer around the periphery of said parison.

In one embodiment, the above process can be carried out with a polymer resin extrusion head for extruding tubular articles, comprising one or more annular extrusion modules disposed along a longitudinal axis of the module or modules;

means for holding the annular extrusion module or modules along the axis;

the extrusion module or modules each having a polymer inlet, a bore having an inner cylindrical surface, and an annular extrusion outlet opening into the inner cylindrical surface;

each of said module or modules having channel means for receiving and distributing polymer extending from the inlet to the outlet and defining a flow path for the polymer to flow from the inlet to the annular extrusion outlet through which the polymer is extruded in annular form, said channel means extending symmetrically around the longitudinal axis of said extrusion module or modules in a manner so as to subject all of the polymer flowing from said inlet to said extrusion outlet to substantially the same process conditions along said flow path whereby the polymer is distributed at the annular extrusion outlet with properties which are substantially symmetrical around the axis for all resin distributed through said outlet.

In another aspect, the invention is summarized by a polymer resin extrusion head for extruding tubular articles, comprising one or more annular extrusion modules disposed along a longitudinal axis of the module or modules;

means for holding the annular extrusion module or modules along the longitudinal axis each extrusion module or modules having a pair of mating coaxial annular members, and means securing the pair of mating annular members together;

the pair of mating annular members defining a resin inlet on the periphery of the module, a coaxial bore having an inner cylindrical surface, an annular extrusion outlet opening into the cylindrical surface;

each pair of mating annular members having channel means formed on mating surfaces of the mating annular members for receiving and distributing resin from the inlet to the annular extrusion outlet and defining a flow path for the polymer to flow from the inlet to the annular extrusion outlet through which the polymer is extruded in annular form, said channel means extending symmetrically around the longitudinal axis of said extrusion module or modules in a manner so as to subject all of the polymer flowing from said inlet to said extusion outlet to substantially the same process conditions along said flow path whereby the polymer is distributed at the annular extrusion outlet with properties which are substantially symmetrical around the axis for all resin distributed through said outlet;

the pair of mating members having inner and outer nested frustoconical portions, respectively, with the outlet defined by an annular space between the frustoconical portions; and the inner frustoconical portion having an inside surface with a greater angle from the axis than the angle of an outside surface of the outer frustoconical portion.

In still another aspect, the invention is summarized in polymer resin extrusion head for extruding multilayer tubular articles comprising a plurality of coaxial annular extrusion modules disposed along a longitudinal axis;

means for holding the modules spaced longitudinally along the axis of the modules;

each module having a pair of mating coaxial annular members, and means securing the pair of mating annular members together;

the pair of mating annular members defining a resin inlet on the periphery of the module, a coaxial bore having an inner cylindrical surface, an annular extrusion outlet opening into the cylindrical surface;

each of said module or modules having channel means for receiving and distributing polymer extending from the inlet to the outlet and defining a flow path for the polymer to flow from the inlet to the annular extrusion outlet through which the polymer is extruded in annular form, said channel means extending symmetrically around the longitudinal axis of said extrusion module or modules in a manner so as to subject all of the polymer flowing from said inlet to said extrusion outlet to substantially the same process conditions along said flow path whereby the polymer is distributed at the annular extrusion outlet with properties which are substantially symmetrical around the axis for all resin distributed through said outlet; and each module further having a center portion which is frustoconical wherein the frustoconical center portion at the center bore has a dimension along the axis which is greater than the axial dimension of the outer portions of each module so that the apex of each preceding module engages the succeeding adjacent module to form air spaces including frustoconical air space portions between adjacent modules to produce enhanced temperature isolation between modules.

In another aspect, the invention is polymer resin extrusion head for extruding multilayer tubular articles comprising an elongate mandrel;

a plurality of coaxial annular extrusion modules spaced longitudinally along the mandrel and extending around successive sections of a mandrel so as to define a tubular extrusion channel between the modules and the mandrel for receiving successive layers extruded by the modules into the tubular extrusion channel;

an annular die mounted downstream from the extrusion modules and having three successive sections for receiving and forming the multilayered tubular extrusion from extrusion channel, the first section having a tapered diameter progressively reduced from the diameter of the annular extrusion channel, the second section having a constant diameter equal to the exit diameter of the first section throughout its length, and the third section having a flared diameter progressively increasing the diameter from the diameter of the second section to a desired diameter.

Other objects, advantages and features of the invention will be apparent from the following description of the preferred embodiment taken in conjunction with the accompanying drawings.

DESCRIPTION OF THE PREFERRED EMBODIMENT

Figure 1:
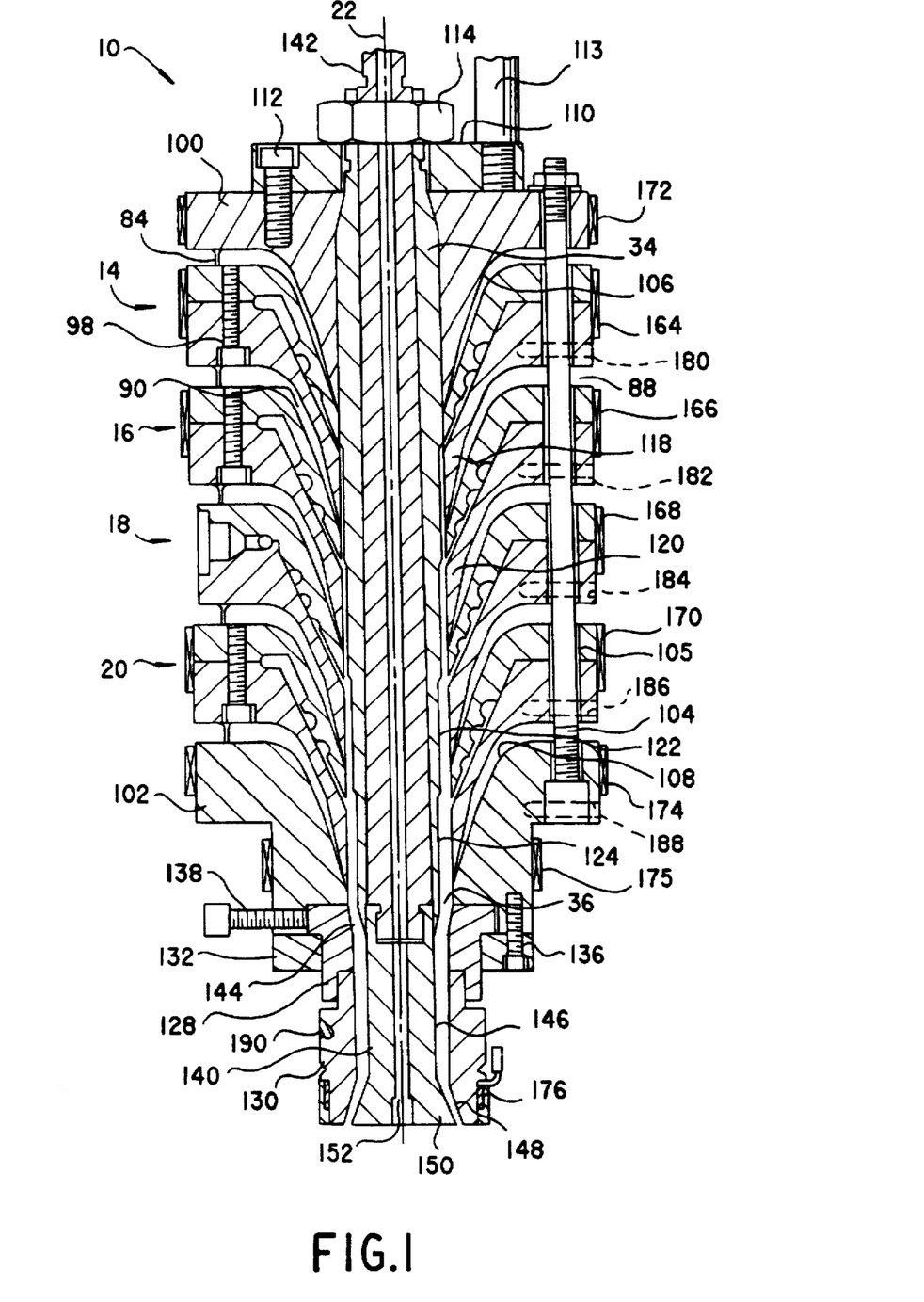
FIG. 1 is a section view of an extrusion head for a extruding a multilayer parison in accordance with the invention.
Figure 7:
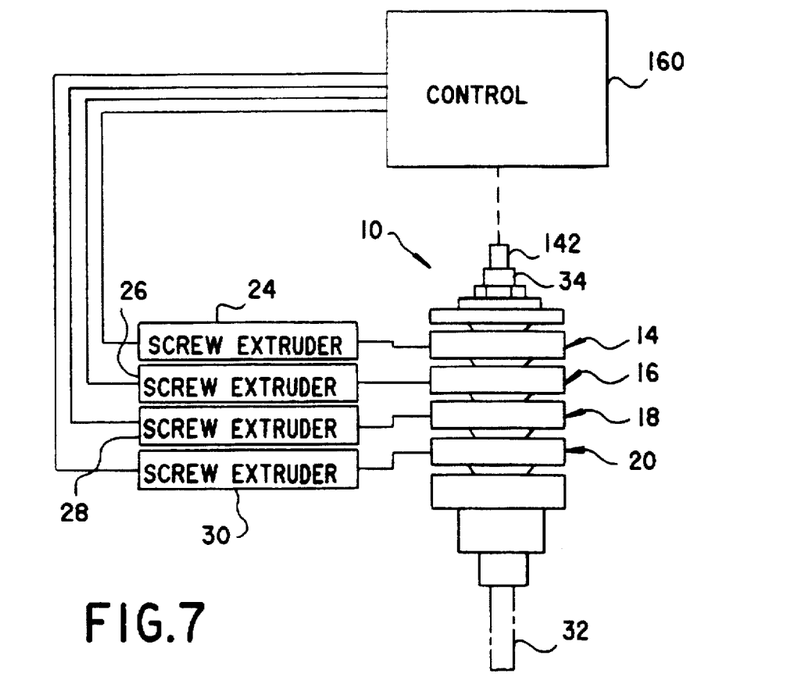
FIG. 7 is a diagrammatic view of a parison extrusion apparatus including the extrusion head of FIG. 1.
Figure 10:
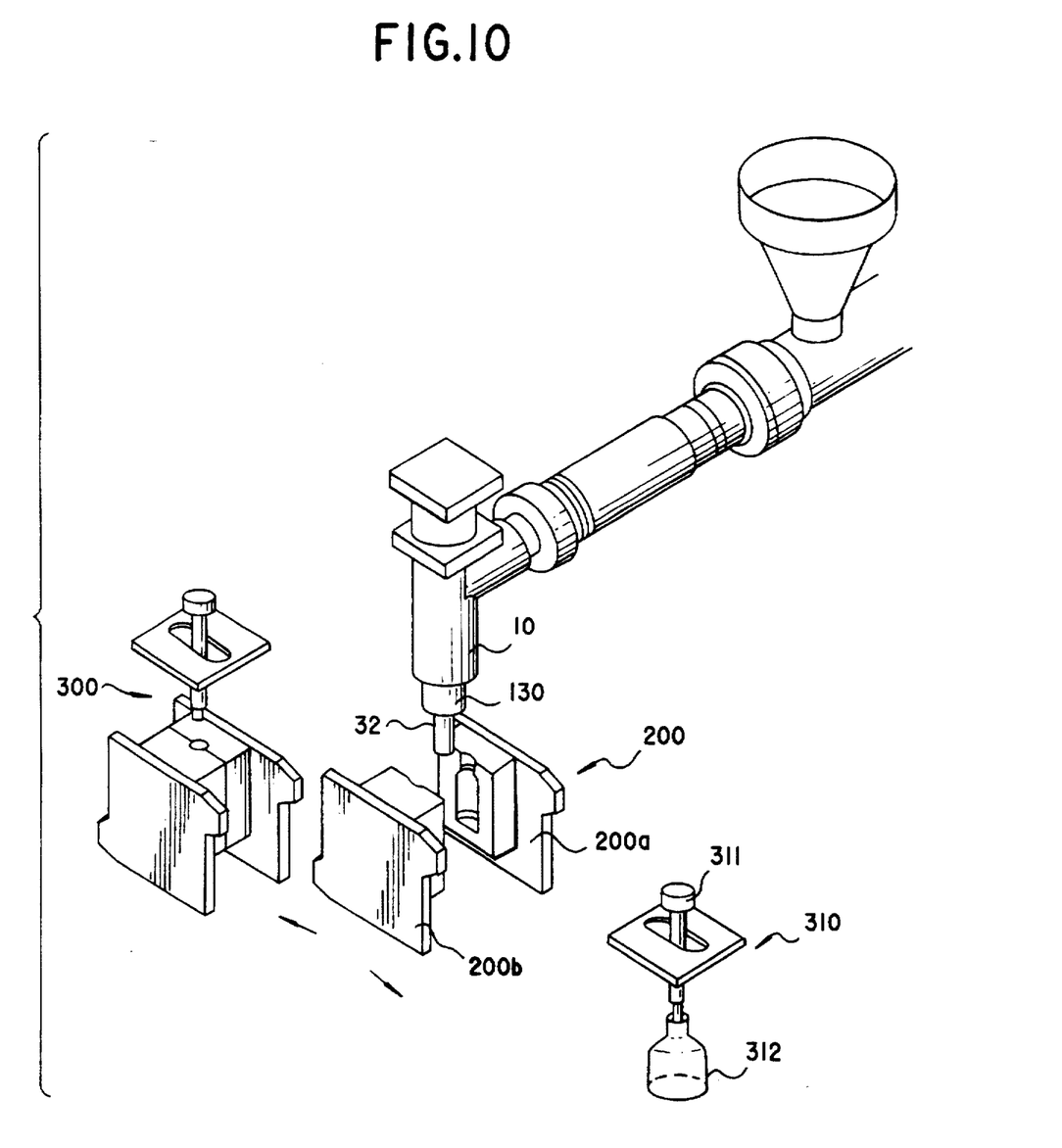
FIG. 10 is a schematic illustration of a container blow molding process and apparatus which can incorporate an extrusion head according to this invention.

As shown in FIG. 7, one embodiment of an extrusion head, indicated generally at 10, in accordance with the invention includes one or more extrusion modules such as a plurality of extrusion modules indicated generally at 14, 16, 18 and 20 which receive streams of different polymer materials from respective conventional screw extruders 24, 26, 28, and 30 for forming a multilayer parison 32 which is then extruded into a container blow mold as illustrated in FIG. 10. As shown in FIG. 1, the modules 14, 16, 18 and 20 are coaxially mounted in spaced relationship along the axis 22 of the modules so as to form air spaces 88 including frustoconical air spaces 90 thermally isolating each module in the head to enable improved extrusion temperature control of each layer being extruded.

In the illustrated parison head, the modules 14, 16, 18 and 20 coaxially extend over spaced sections of a tapered stepped mandrel 34 so as to extrude their respective layers into a tubular extrusion channel 36 defined between the inner surfaces of the modules and the outer surface of the mandrel.

The modules 14, 16, 18 and 20 have substantially similar constructions. As shown in FIG. 3 for the module 18, each of the modules includes upper and lower members 40 and 42 which mate together and include a plastic material inlet 46 opening on the periphery of the module, an annular outlet 48 opening at the inner surface of the module, and one or more spiral channels such as a pair of spiral channels 50 and 51, FIGS. 2 and 3, extending from bifurcated inlet channels 52 and 53 to a position adjacent to the outlet 48. The inlet 46 is formed by machining the mating surfaces of the members or by boring along the parting line between the outer portions of the members. Alternatively, the inlet 46 can be formed by boring in one of the members 40 or 42 similar to that shown in U.S. Pat. No. 4,798,526. The inlet bifurcated channels 52 and 53 are machined in opposite directions through ninety degree arcs in the mating surfaces of the outer flange portions of the members 40 and 42. The mating flat or land surfaces of the flange portions of the members 40 and 42 sealingly engage each other to close the channels 52 and 53.

Figure 4:
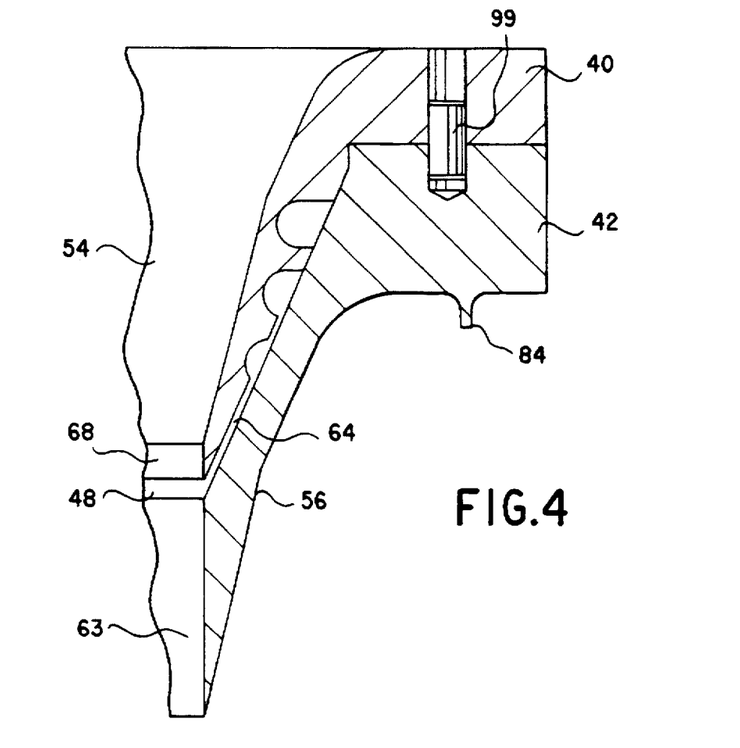
FIG. 4 is a sectional view, taken at line 4—4 of FIG. 2, of a portion broken away from the module of FIG. 3.
Figures 5, 6:
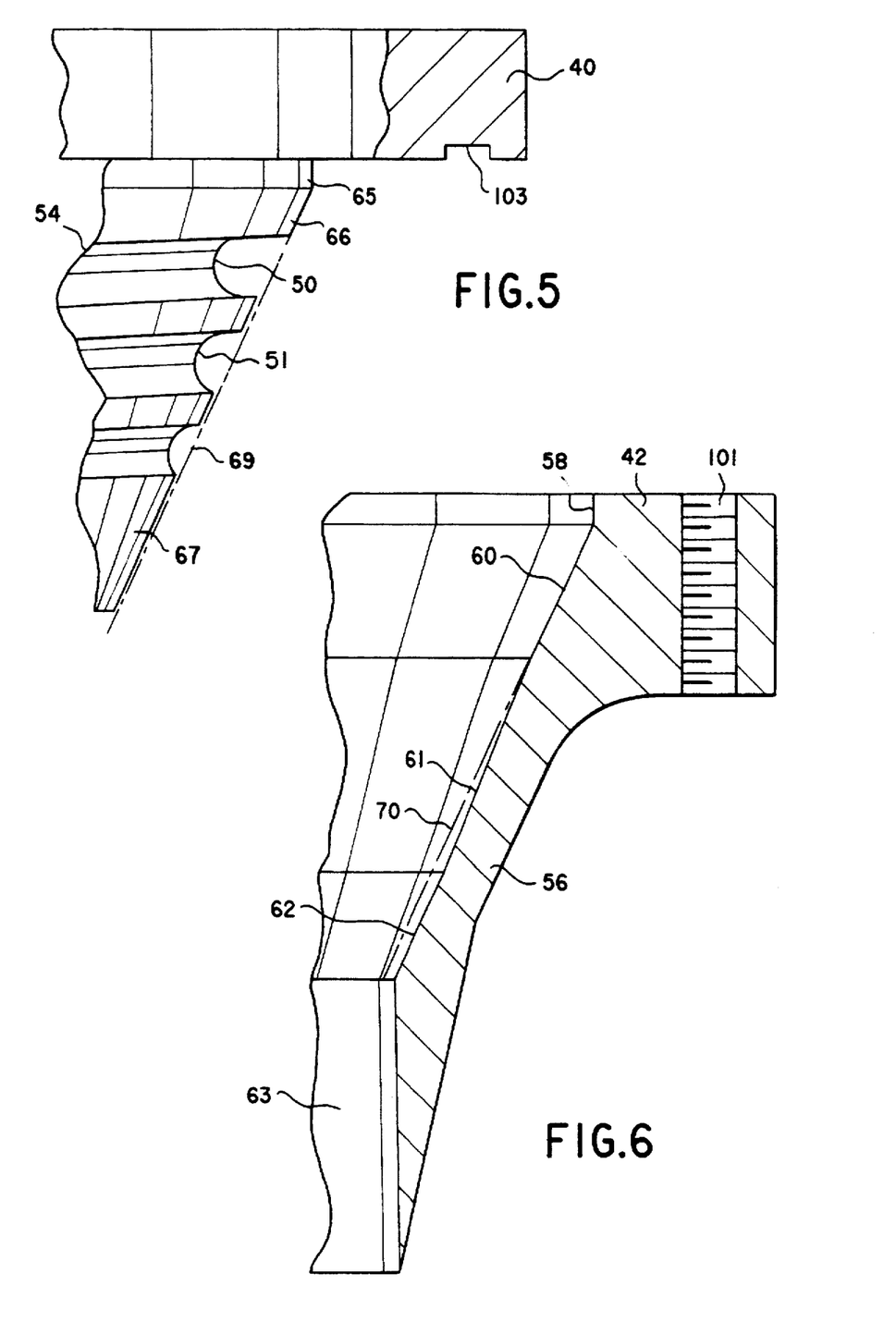
FIG. 5 is an elevational view, partially in section, of a broken away portion of an upper member of the module of FIG. 3 with the section taken at line 5,6—5,6 of FIG. 2.
FIG. 6 is an elevational sectional view of a broken away portion of a lower member of the module of FIG. 3 with the section taken at line 5,6—5,6 of FIG. 2.

Center portions 54 and 56 of the members 40 and 42 are generally frustoconical with apexes extending downstream. As shown in FIG. 6, the inside surface of the center portion 56 has a cylindrical ring portion 58 and three successive frustoconical portions 60, 61 and 62 which extend inward from the ring portion 58 to the cylindrical surface 63 of a bore which defines a portion of the outer wall of the tubular extrusion channel 36, FIG. 1. The slant angle of the surface 61, i.e., the angle of the surface 61 relative to the axis 22, is less than the slant angle of the surfaces 60 and 62 so that the thickness of an annular frustoconical space or passage 64, FIG. 4, between the portions 54 and 56 gradually increases over the region of the spiral channels 50 and 51, as illustrated by the short and long dashed line 70 which has the same angle as surfaces 60 and 62. As shown in FIG. 5, the outside surface of the inner frustoconical portion, 54 has a cylindrical ring portion 65 sealingly engaging the surface 58, a first frustoconical surface portion 66 extending inward from the ring portion 65 to the first convolution of the spiral channels 50 and 51, and a second frustoconical surface portion 67 extending inward from the outermost spiral convolution formed by channels 50 and 51 to the apex of the frustoconical portion 54 where a cylindrical surface 68 of above, FIG. 4, defines a portion of the outer wall of the tubular extrusion channel 36. The bores defining cylindrical surfaces 63 and 68 are coaxial. Edges 71, FIG. 2, between the first and second frustoconical surfaces 66 and 67 are formed in the land areas between the first convolutions of the spiral channels 50 and 51. The first frustoconical surface portion 66 has a slant angle equal to surface 60 so that surface portion 66 sealingly engages the surface portion 60. The second frustoconical surface portion 67 also has the same slant angle as surfaces 60 and 66 but has a reduced diameter, as illustrated by the long and short dashed line 69 which is an extension of the surface 66, so as to introduce an initial frustoconical space or thickness between the surface 61 and the land areas separating the spiral channels 50 and 51 to begin the frustoconical passage 64. At its inner end the frustoconical passage 64 defines the outlet 48.

Figure 2:
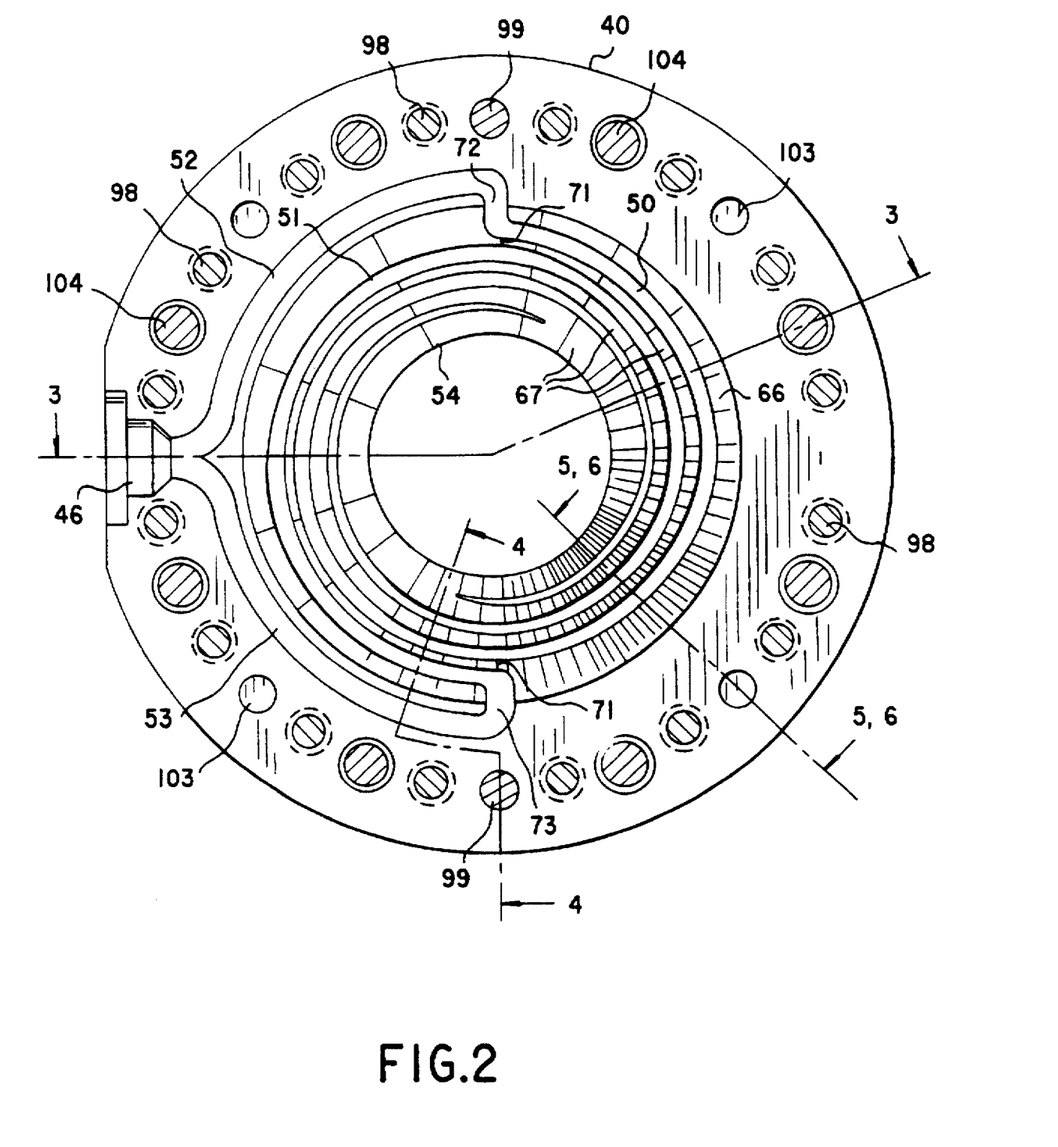
FIG. 2 is a bottom view of an upper member of one extrusion module in the head of FIG. 1.
Figure 3:
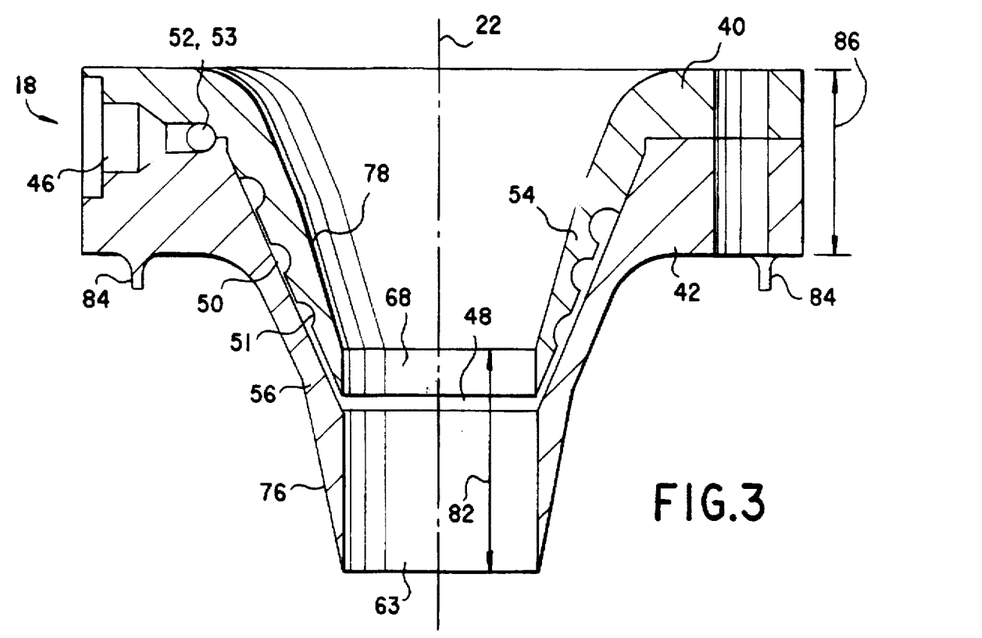
FIG. 3 is a sectional view, taken at line 3—3 of FIG. 2, of an extrusion module removed from the head of FIG. 1.

Referring to FIG. 2, the inlet channels 52 and 53 have extensions 72 and 73 machined in the surfaces 65 and 66 of the inner center portion 54 to open into the origins of the respective spiral channels 50 and 51, these origins are on opposite sides, 180° apart. The spiral channels 50 and 51 are formed by machining the frustoconical surface 67 of the inner frustoconical portion 54 and each extend clockwise for approximately one and one-half convolutions about the frustoconical portion 54. The cross-sectional area of each channel 50 and 51 gradually decreases from its origin to its endpoint so that the polymer forced into each channel at its origin is gradually dispersed into the increasing width of the frustoconical passage 64 to distribute the polymer evenly about the frustoconical portion 54. The pitch of the spiral channels, i.e., the spacing between adjacent convolutions, is constant and the depth of the spiral channels relative to surface 67 changes linearly so as to facilitate the machining of the channels.

The length of the spiral channels must together circumscribe or extend symmetrically around the longitudinal axis of the extrusion module or modules, i.e., extend substantially 360° around the axis of the bore which the mating inner and outer portions create to form extrusion channel 36, so as to subject all of the polymer flowing from the inlet to the outlet to substantially the same process conditions. "Circumscribe," as used herein, is meant to include circular as well as non-circular paths. Such channels provide a means whereby the polymer is distributed at the annular extrusion outlet with properties which are substantially symmetrical around the axis of the extrusion module or modules for all resin which is distributed through the outlet.

Figure 8:
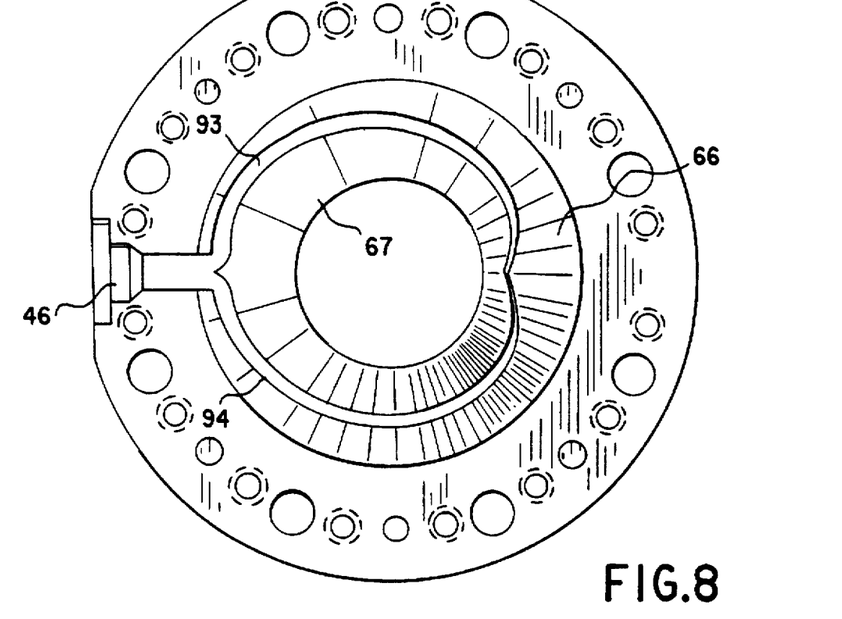
FIG. 8 is a view similar to FIG. 2 showing a variation of the spiral channel in the upper member of the extrusion module.
Figure 9:
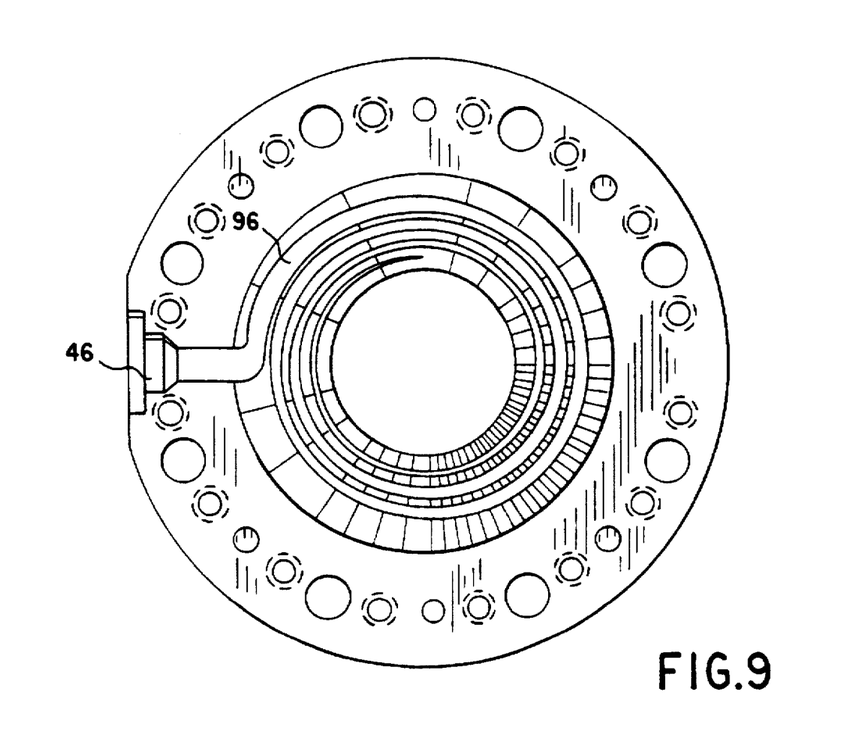
FIG. 9 is a view similar to FIGS. 2 and 6 showing another variation of the spiral channel in the upper member of the extrusion module.

In the modification shown in FIG. 8, channels 93 and 94 extend in opposite directions each through a minimum of 180° along spiral paths so that the channels 93 and 94 together extend completely around the inner frustoconical portion. The numbers of spiral channels and their direction can vary. The modification of FIG. 9 illustrates a single spiral channel 96 which makes more than three full convolutions around the inner frustoconical portion.

Referring back to FIG. 3, the outside surface 76 of the lower portion of the lower frustoconical portion 56 has a slant angle which is less than the slant angle of the inside surface 78 of the upper frustoconical portion 54 so that the width 82 of the inside surface of the module 18 along the axis 22 is greater than the width 86 of the outer portions of the module 18. The difference between the widths 82 and 86 is selected to provide the desired spacing 88, FIG. 1, between adjacent modules. The lower edge of the apex of each higher module 14, 16 and 18 engages the upper side of the next lower module 16, 18 and 20 to define the spacing 88 between modules. Spacers 84 formed on the bottom of the flanges of the lower members 42 abut the adjacent modules to assist in maintaining even spacing between the flanges or outer portions of the modules around their circumference. These spacers 84 are broken by the various bores into the flange so as to permit air flow into and out of the spaces 88. The frustoconical air space portions 90 of the spaces 88 extend to the points of engagement between modules.

Bolts 98, FIGS. 1 and 2, secure the upper and lower members 40 and 42 of the extrusion modules 14, 16, 18 and 20 together. Guide pins 99, FIGS. 2 and 4, provide for proper alignment of the members 40 and 42 during assembly. Threaded bores 101, FIG. 6, in the members 42 are aligned with recesses 103, FIGS. 2 and 5, in the members 40 so that conventional jacking bolts (not shown) can be screwed into the bores 101 to engage the recesses and force the members 40 and 42 apart during disassembly.

As shown in FIG. 1, the modules 14, 16, 18 and 20 are held in the extrusion head 10 by upper and lower clamp members 100 and 102 and by bolts 104, see also FIG. 2, which extend through bores in the clamp members and the extrusion modules. The lower surface 106 of the upper clamp member 100 has a convex frustoconical configuration similar to the lower surface of the extrusion modules 14, 16, 18 and 20, and the upper surface 108 of the lower clamp member 102 has a concave frustoconical configuration similar to the upper surface of the extrusion modules. This enables extrusion modules to be interchanged in position as well as the clamp members to be used to hold a single extrusion module or any number of modules.

The mandrel 34 is tubular and extends through the upper clamp member and a mounting plate 110 fastened by bolts 112 to the upper clamp member 100. Bolts 113 secure the mounting plate 110 to conventional blow molding and supporting structures (not shown). A threaded nut 114 secures the upper end of the mandrel which has a tapered fit in the clamp member 100. The mandrel 34 is tapered downward with by a plurality of successive steps 118, 120, 122 and 124 which begin at each corresponding outlet of the modules 14, 16, 18 and 20 to provide for the extrusion of the successive polymer layers on the mandrel. The diameters of each step are selected in accordance with the desired thickness of the corresponding layer being extruded. Generally different mandrels are required for different arrangements of extrusion modules.

Alternatively, the mandrel can have a constant diameter through the extrusion modules and the inner diameters of the extrusion modules can be stepped. This limits the interchangeability of the modules, but blank modules can be manufactured with the inner diameters machined later after the extrusion head configuration is determined.

Annular upper and lower dies 128 and 130 are mounted by a die clamp 132 and bolts 136 and 138 on the bottom of the module clamp member 102. The lower die 130 is threaded to the upper die 128. Positioned within the dies is a die core 140 which is threaded onto the lower end of a shaft 142 slidably extending through the lumen of the mandrel 34. The die 128 has its die opening tapered or stepped down in diameter at 144 in correspondence to the tapered terminal end of the mandrel 34 so that a constant cross-sectional area of the extrusion passage is maintained. This reduced diameter extends along a section 146 of constant diameter through the upper portion of the lower die 130 with the bottom portion 148 of the lower die flaring out to the desired diameter of the article or parison. The bottom portion 150 of the die core 140 flares outwardly at an angle slightly greater than the angle of the die portion 148 so that the exit thickness of the annular extrusion channel is less than the upper portion of the extrusion channel to insure that the layers of plastic polymer are firmly bonded together and that the cross-sectional area of the extrusion passage is maintained.

In order to assure that the polymer layers are preferably radially compressed to some degree upon being extruded from the die, the cross-sectional area of the annular channel at the exit from the bottom of the die portions 148 and 150 is slightly less than the cross-sectional area at the entrance portion of the channel. In other words, the extruded multi-layer polymer structure is preferably compressed slightly by reason of the reduction in the cross-sectional area of the flow passage formed by the channel formed by the elements 148 and 150 in the direction of the exit therefrom. This assures compression of the multi-layer structure as it exits from the die and provides firm bonding and enhanced structural integrity of the extruded multi-layer parison.

Figure 11:
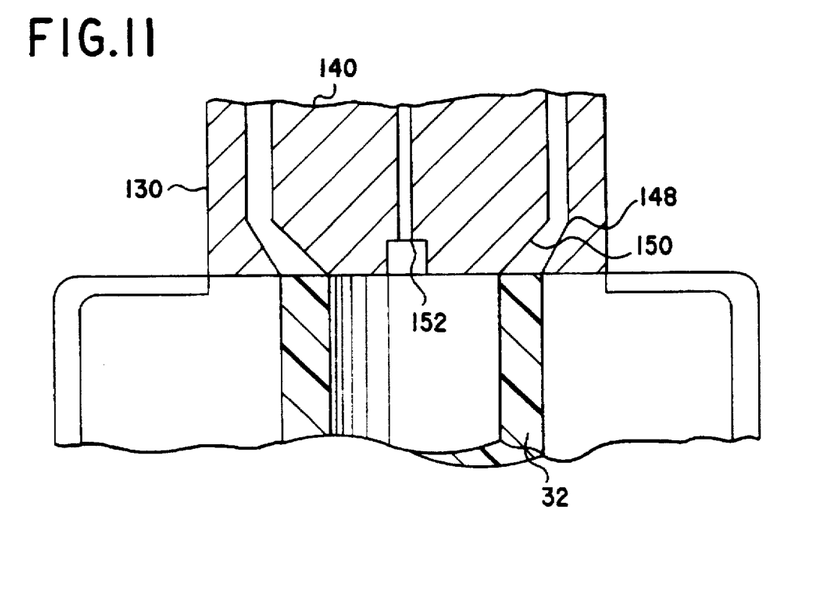
FIG. 11 is a partial view in cross section of an annular die according to the invention.

As illustrated in FIG. 11 the bottom portion 150 of the die core 140 can alternatively flare inwardly at an angle greater than the angle of the die portion 148. As a result the die is inwardly tapered, but has an expanding extrusion channel annulus. In the embodiment of FIG. 11, the same contraction in cross-sectional area of the annular flow passage is preferably provided in order to compress the extruded multi-layer structure as it exits the die.

A center longitudinal bore 152 is formed through the die core 140 and the shaft 142 for passing gas into the parison being extruded to prevent collapse of the parison.

The extrudate exits the above-described die into a container blow mold according to conventional techniques. As illustrated in FIG. 10 parison 32 exits into a container blow mold 200. Container blow mold 200 can be a conventional split mold which is divided into halves 200a and 200b along its longitudinal axis and has a shape selected for the particular container desired. The extruded parison 32 is then processed according to conventional blow molding techniques. See, for example, "Blow Molding", Modern Plastics, October 1991, pp. 222-224.

For example, after parison 32 exits into container blow mold 200 halves 200a and 200b of the mold come together, thereby pinching the bottom of parison 32 to form a seal. The sealed bottom of the parison will become the bottom of the finished container. Shortly after the bottom of the parison is pinched, a conventional cutting blade (not shown) severs the parison from the extrudate exiting the annular die 130. The container blow mold 200 is then removed from under annular die 130 and replaced with another mold 300 to repeat the process described above. This particular process is known as a single-station shuttle process.

After the container blow mold is removed from under extrusion head 10, container blow mold 200 is shuttled to calibration station 310. A blow pin 311 is then inserted into container blow mold 200 and parison 32 to inflate the parison into a container schematically illustrated as 312 in FIG. 10. Container blow mold 200 is not illustrated at calibration station 310 in order to better illustate container 312. The blown container 312 is then separated from mold 200 and trimmed using standard techniques.

As shown in FIG. 7, the illustrated parison extrusion apparatus includes a conventional control 160 which controls the vertical position of the shaft 142 in the mandrel 34. Parisons being extruded are often varied in thickness from the bottom to the top; i.e., bottle bottom portions having inverted bottoms need thicker walls at the bottom to prevent bulging of the bottoms from the pressure of the bottle contents such as a carbonated beverage. Additionally the control 160 can vary the extrusion pressures of the extruders 24, 26, 28 and 30 to vary the thickness of each layer being extruded relative to the other layers in a conventional manner. For example, the thickness of a barrier layer can be maintained uniform throughout the bottle height while the thickness of a structural layer is reduced in upper portions of the bottle.

Referring back to FIG. 1, electrical heater coils 164, 166, 168, 170, 172, 174, 175 and 176 are mounted on the extrusion modules 14, 16, 18 and 20, the clamp members 100 and 102 and the lower die member 130, respectively, for initially heating the corresponding members to their desired operating temperatures as well as maintaining a proper temperature during operation. Thermocouple sensing elements 180, 182, 184, 186, 188 and 190 provide temperature signals of the extrusion modules 14, 16, 18 and 20, the lower clamp 102, and the die member 130 to conventional control circuitry (not shown) operating the heater coils.

In an example of a parison suitable for blow molding to form a bottle, the parison is formed by extruding inner and outer layers of polycarbonate, and intermediate layers of amorphous polyamide and regrind through multiple extrusion modules. However, there may be instances where a single material has properties which meet all of the requirements of a particular container application. In those instances, parisons having only one layer are needed. Accordingly, those single-layered parisons can also be prepared into single-layered containers according to the invention wherein only one extrusion module would be used.

The described embodiment has several advantages over the prior art extrusion apparatus. The spiral channel or channels forming together at least one full convolution gradually opening into the frustoconical passage 64 results in pressure differentials in the channel or channels being cancelled by pressure differentials in the thinner upper portions of the frustoconical passage 64. This eliminates the need for an annular pressure equalization and distribution chamber which is generally required in prior art tubular article extrusion apparatus. Such equalization and distribution chambers still have some unequal pressure, i.e., there must be a pressure differential to produce plastic polymer flow from one side to the other side of the annular chamber. The uneven pressure around the annular outlet produces uneven thicknesses in the layers being formed in the parison. Thus the embodiments of FIGS. 1–9 produce superior circumferential layer thickness uniformity.

Furthermore a generally restrictive frustoconical transfer passage extends from the prior art equalization and distribution chamber to the annular outlet in order to minimize the pressure differential in the equalization and distribution chamber. This prior art restrictive transfer passage results in a requirement for a substantially higher melt pressure compared to the present embodiment which relies upon at least one convolution formed by a channel or by the combined length of two or more channels of decreasing cross section opening into the gradual increasing thickness of the frustoconical passage 64 to minimize circumferential pressure differentials at the outlet 48. The size of the spiral channel or channels and the thickness of the passage 64 are selected to produce substantially less pressure drop between the inlet 46 and outlet 48 compared to the prior art.

Still further the elimination of the prior art equalization chamber with its opening into a restrictive frustoconical transfer passage reduces shear on the plastic polymer that is produced by such opening. Substantially less shear results from the present gradual opening of the spiral channel or channels through one or more spiral convolutions in the frustoconical passage 64. This results in increased strength in the article being produced.

Circumferential polymer extrusion temperatures tend to be more uniform in extrusion heads according to the invention, and substantially more uniform in the embodiments having two or more spiral distribution channel convolutions. As discussed earlier, since polymer melt in the prior art flows from the inlet side of the equalization and distribution chamber to the opposite side, a temperature differential can be produced where the inlet polymer melt temperature differs from the average temperature of the distribution module. As a result, the actual and latent internal stresses discussed above occur. However, in extrusion heads according to this invention all portions of the polymer material flowing from the inlet to the annular extrusion channel are exposed to substantially the same process conditions, e.g., temperature, pressure, shear, etc., along the channel means from the inlet to the annular extrusion channel. Therefore, all of the polymer arriving at the annular extrusion channel has substantially the same process history, that is a substantially identical prior exposure to such process conditions, and is therefore substantially uniform in its properties around the periphery of the extrusion channel as it is extruded therefrom. Thus, the tendency for circumferential temperature differentials and the occurrence of non-homogeneities are reduced.

Reducing the occurrences of non-homogeneities allows one to produce parisons and bottles which are believed to be superior to those in the art. As indicated earlier, reducing non-homogenous distribution of resin which result from pressure and temperature differentials, as well as other processing differentials, reduces the number of actual and latent internal stresses in any parison, bottle or like article prepared from the resin. Accordingly, the resulting bottle or like article will possess superior ability to maintain its integrity under external stresses.

The term "properties" as used herein refer to those properties which are the result of process conditions applied to the resin during the flow from the inlet to the outlet. These include such parameters as process temperatures, pressures, shear conditions and other process conditions to which the polymer is exposed along the path of flow from the inlet to the annular extrusion outlet. The flow path is arranged symmetrically around the periphery of the axis of the module(s) so that all of the polymer is exposed to substantially the same process conditions during its flow from the inlet to the extrusion outlet, with the result that it arrives at the extrusion outlet with substantially symmetrical and homogenous properties around the full periphery of the extrusion outlet.

The present embodiment also provides greater temperature isolation between adjacent modules with a relatively simple and inexpensive structure. The prior art included abutting collars for spacing modules, but the collars had substantial thickness to transfer heat between modules. The present embodiment by including frustoconical air spaces 90 provides improved temperature isolation between extrusion modules.

Still further, the die output structure with section 144 reducing the annular extrusion channel diameter followed by the section 146 of uniform diameter and then the section 148 producing an increase in diameter to the desired container or parison diameter, results in improved product by eliminating prior art tendencies for failure of multiple layers to adhere uniformly together.

While the described embodiment is directed to manufacture of parisons used for blow molding bottles, the disclosed modular extrusion head is suitable for the manufacture of many other tubular articles such as film which is formed by slitting a tubular form with or without blowing of the tubular form; pipe or other elongated profile article which may or may not be filled with foam such as through bore 152; glass mat reinforced sheet wherein polymer is extruded from one or more annular extrusion heads with rectangular center bores onto a glass fiber mat; pultruded sheet, rod or profile article; and wire coatings. For certain applications such as forming wire coatings or extruding coatings on other elongated materials, the extrusion head does not include a mandrel; rather the object on which the coatings are being extruded take the place of the mandrel. The term "container" is used herein to include all of the above described articles.

The container of the present invention is remarkably superior to those formed by prior art methods in that it is relatively free from residual internal stresses otherwise carried forward from the parison by reason of the fact that the polymers of which such prior art parisons were formed were subjected to non-uniform processing conditions in the extrusion head. These non-uniform conditions resulted from the fact that flow paths from the inlets of such prior art extrusion apparatus were non-symmetrical in flow patterns from the inlets to the annular extrusion channel. In the apparatus and method of the present invention, such flow paths extend symmetrically about the axis of each module such that all of the polymer flowing from the inlet to the extrusion channel is subjected to substantially the same process conditions, whereby the properties of the polymer are substantially the same and homogeneous around the full periphery of the annular extrusion channel at the point of extrusion from the channel.

The parison thus formed is therefore substantially free from residual internal stresses that would otherwise occur as a result of such non-uniformities and non-homogeneities. The same advantages are realized whether the container is formed from a single layer or from a plurality of layers in accordance with the present invention. In either case, the finished container is substantially free from residual internal stresses which would otherwise be present from the formation of the parison. It is thus believed that the finished container of this invention can be effectively and safely reused or reclaimed.

The above described embodiment is only illustrative of the disclosed embodiment and many other embodiments, variations, modifications, and changes in detail can be devised without departing from the scope and spirit of the invention as defined in the following claims.

What is claimed is:

1. A process for forming articles from a polymeric resin, comprising: disposing and securing a plurality of extrusion modules along a longitudinal axis; each of said modules having outer periphery and coaxially aligned annular resin outlets extending along the longitudinal axis and having an upper member having a lower surface and a lower member having an upper surface, said, respective lower and upper surfaces facing to define an annular frustoconical resin passage between said surfaces wherein at least one of said facing surfaces has a frustoconical shape, each of said modules having a resin inlet on the periphery of said module communicating with a respective resin passage for introducing the resin to the respective resin passage, each of said modules having a respective annular resin outlet communicating with the respective resin passage for extruding the resin from the resin passage in annular form, each of said respective resin passages include a pair of inlet extensions communicating with said resin inlet for distributing resin to opposing spaced apart locations, a pair of spiral channel means extending from respective inlet extensions for defining a spiral flow path for resin introduced through the resin inlet to flow from respective inlet channels to the annular resin outlet, wherein each spiral flow path extends in the same direction and substantially symmetrically circumscribes the longitudinal axis of the module, each of said spiral channel means being formed on at least one of said upper or lower surface having a frustoconical shape and having a cross-sectional area gradually decreasing long the length thereof from an origin thereof to an endpoint with the depth of respective spiral channels changing linearly along a direction from a respective inlet extension toward a respective annular outlet wherein each spiral channel has a substantially constant pitch along said frustoconical surface, said respective lower surface of said upper member and said respective upper surface of said lower member diverging toward said annular outlet for increasing the thickness of said resin passage along the length of the spiral channel from said origin thereof to said end point thereof whereby resin is gradually dispersed from said respective spiral channels into the increasing width of the frustoconical passage to distribute resin thereto and evenly distributed about said annular outlet so that all resin that is introduced to a respective module through a respective resin inlet flows through the resin passage to said resin outlet is subjected to substantially the same process conditions within the module; introducing the resin into said respective resin inlets under conditions that allow the resin to flow through the channel means to the respective annular resin outlets whereby the resin arrives at each annular outlet with properties which are substantially uniform around the entire annular resin outlet; extruding the resin through the respective annular resin outlets to form an annular shaped article.

2. A process as defined in claim 1 wherein the resin inlet is bifurcated to split the resin introduced through the resin inlet into two resin streams and the channel means direct the respective resin streams to flow in the same direction for at least 180° around the longitudinal axis of the module prior to arrival of the resin at the resin outlet.

3. A process as defined in claim 2 wherein said respective spiral channel means direct the respective resin streams in the same direction by defining a flow path for the resin streams that is split into two respective spirally configured branches wherein said branches communicate with each other through said annular frustoconically passage.

4. A process as defined in claim 1, wherein the channel means comprise one or more channels defined in said outer surface of said inner portion of the module.

5. A process as defined in claim 1, wherein the resin passage extends from the resin inlet to the resin outlet in a flow direction and said resin outlet has a cross sectional area that increases in the flow direction.

6. A process as defined in claim 5, wherein the spiral channel means within the flow passage have a cross sectional area that decreases in the flow direction so that the resin introduced through the resin inlet is gradually dispersed from the spiral channel into the frustoconically shaped channel portion as the resin flows toward the resin outlet.

7. The process of claim 1, wherein the resin passage and channel means minimize circumferential differentials of pressure and temperature acting upon the resin within the module and minimize the shear stresses acting upon the resin within the module.

8. A process for forming articles from a polymeric resin, comprising disposing and securing a pair of mating members along a longitudinal axis; said members having facing surfaces and forming an annular module having an outer periphery, a resin inlet on said periphery and an annular resin outlet, a resin passage between said facing surfaces having an annular frustroconical shape, said resin inlet communicating with said annular resin outlet for the flow of resin, a pair of spiral channel means extending for defining a spiral flow path for resin introduced through the resin inlet to the annular resin outlet wherein each spiral flow path extends in the same direction and substantially symmetrically circumscribes the longitudinal axis of the module, each of said spiral channels being formed on at least one of said upper or lower surface having a frustoconical shape and having a cross-sectional area gradually decreasing long the length thereof from an origin thereof to an endpoint with the depth of respective spiral channels changing linearly along a direction from a respective inlet toward a respective annular outlet wherein each spiral channel has a substantially constant pitch along said frustoconical surface, said passage having an annular frustoconical shape diverging toward said annular outlet for increasing the thickness of said resin passage along the length of the spiral channel whereby resin is gradually dispersed from said respective spiral channels into the increasing width of the frustoconical passage to distribute resin thereto and evenly distributed resin about said annular outlet so that all resin that is introduced to a respective module through a respective resin inlet flows through the resin passage to said resin outlet is subjected to substantially the same process conditions within the module; introducing the resin into said respective resin inlets under conditions that allow the resin to flow through the channel means to the respective annular resin outlets whereby the resin arrives at each annular outlet with properties which are substantially uniform around the entire annular resin outlet; extruding the resin through the respective annular resin outlets to form an annular shaped article.

9. A process for forming articles from a polymeric resin according to claim 7, wherein said spiral channel has an arced cross section.

10. A process for forming articles from a polymeric resin according to claim 8, wherein said arced cross section has substantially the same radius along the length of said spiral channel.

11. A process for forming articles from a polymeric resin according to claim 8, wherein the depth of said arced cross section gradually decreases long the length thereof toward said annular resin outlet.

12. A process for forming articles from a polymeric resin according to claim 7, wherein said facing surfaces include straight cross sections.

13. A process for forming articles from a polymeric resin according to claim 7, wherein the resin inlet is bifurcated to split the resin introduced through the resin inlet into two resin streams and the channel means direct the respective resin streams to flow in the same direction for at least 180° around the longitudinal axis of the module prior to arrival of the resin at the resin outlet, said upper surface and said lower surface diverging to form a frustoconically shaped channel portion.

14. A process for forming articles from a polymeric resin according to claim 7, wherein the channel means direct the respective resin streams in the same direction by defining a flow path for the resin streams that is split into two respective spirally configured branches wherein said branches communicate with each other through said frustoconically shaped channel portion.

* * * * *